United States Patent
Abbasi et al.

(10) Patent No.: US 11,807,822 B2
(45) Date of Patent: Nov. 7, 2023

(54) PRODUCING SYNTHETIC GAS

(71) Applicant: Saudi Arabian Oil Company, Dhahran (SA)

(72) Inventors: Yasir H. Abbasi, Dhahran (SA); Abdullah M. Al-Harbi, Dhahran (SA); Abderrazak Traidia, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 11 days.

(21) Appl. No.: 16/268,378

(22) Filed: Feb. 5, 2019

(65) Prior Publication Data

US 2020/0248087 A1 Aug. 6, 2020

(51) Int. Cl.
 *C10J 3/72* (2006.01)
 *C01B 3/02* (2006.01)
 (Continued)

(52) U.S. Cl.
 CPC ............... *C10J 3/72* (2013.01); *C01B 3/02* (2013.01); *C10J 3/78* (2013.01); *F25B 39/02* (2013.01);
 (Continued)

(58) Field of Classification Search
 CPC .. C10J 3/506; C10J 2200/152; C10J 230/093; C10J 2300/0959; C10J 2300/1846;
 (Continued)

(56) References Cited

U.S. PATENT DOCUMENTS

| | | | |
|---|---|---|---|
| 1,504,732 A * | 8/1924 | Wilson | F28D 7/024 165/DIG. 441 |
| 2,967,515 A * | 1/1961 | Hofstede | F22B 1/1892 122/7 R |

(Continued)

FOREIGN PATENT DOCUMENTS

| | | |
|---|---|---|
| DE | 4404068 | 8/1995 |
| EP | 2886630 | 6/2015 |

(Continued)

OTHER PUBLICATIONS

American Society of Mechanical Engineers "Large Diameter Steel Flanges" NPS 26 Through NFS 60 Metric/Inch Standard, An American National Standard, ASME B16.47-2011 (Revision of ASME B16.47-2006), Oct. 20, 2011, 5 pages.

(Continued)

*Primary Examiner* — Kaity V Chandler
(74) *Attorney, Agent, or Firm* — Fish & Richardson P.C.

(57) ABSTRACT

A syngas production system includes a gasification reactor and a syngas pressure vessel downstream of the gasification reactor. The syngas pressure vessel includes a pressure vessel having a body with a first portion and a second portion. The syngas pressure vessel also includes an evaporator disposed in the pressure vessel; a coil disposed in the pressure vessel; and a tongue-and-groove flange assembly. The tongue-and-groove flange assembly includes: a first flange with a raised ring extending from a face of the first flange, the first flange attached to the first portion of the body; a second flange with a groove defined in a face of the second flange. The second flange is attached to the second portion of the body. The raised ring extends from the face of the first flange and is positioned in the groove defined in the face of the second flange.

14 Claims, 4 Drawing Sheets

(51) Int. Cl.
*C10J 3/78* (2006.01)
*F25B 39/02* (2006.01)

(52) U.S. Cl.
CPC .... *C10J 2200/09* (2013.01); *C10J 2300/1603* (2013.01)

(58) Field of Classification Search
CPC ...... C10J 2300/0946; C10J 3/723; C10J 3/74; C10J 2300/0956; C10J 3/78; C10J 2300/0943; C10J 2300/0976; C10J 2300/0973; C10J 2300/1823; C10J 2300/0969; C10J 3/487; C10J 3/86; C10J 3/466; C10J 3/485; C10J 3/50; C10J 2200/15; C10J 2300/1665; C10J 3/72; C10J 3/80; C10J 2200/09; C10J 2300/0966; C10J 2300/1246; C10J 2300/1253; C10J 2300/1668; C10J 2300/1675; C10J 2300/1884; C10J 2300/1892; C10J 3/48; C10J 3/482; C10J 3/56; C10J 3/66; C10J 3/84; C10J 2300/0979; C10J 2300/1696; C10J 3/20; C10J 3/58; C10J 1/20; C10J 2200/154; C10J 2200/36; C10J 2300/0903; C10J 2300/0906; C10J 2300/0916; C10J 2300/0933; C10J 2300/1223; C10J 2300/1628; C10J 2300/165; C10J 2300/1659; C10J 2300/1687; C10J 3/00; C10J 3/18; C10J 3/26; C10J 3/34; C10J 3/526; C10J 3/62; C10J 3/726; C10J 3/845; C10L 3/10; C10L 2290/06; C10L 3/08; C10L 5/445; C10L 2290/02; C10L 2290/30; C10L 2290/543; C10L 2290/547; C10L 3/101; C10L 3/102; C10L 5/406; F28F 1/08; F28F 13/12; F28F 1/00; F28F 1/36; F28F 21/062; F28F 13/06; F28F 9/0132; F28F 2250/08; F28F 27/02; F28F 23/00; F28F 2250/06; F28F 9/013; F28F 1/02; F28F 9/22; F28F 1/14; F28F 5/02; F28F 1/12; F28F 1/40; F28F 13/08; F28F 2009/224; F28F 27/00; F28F 9/0131; F28F 2210/10; F28F 1/22; F28F 1/42; F28F 21/06; F28F 2240/00; F28F 9/00; F28F 9/026; F28F 1/126; F28F 21/00; F28F 2235/00; F28F 2260/02; F22B 35/005; F22B 35/104; F22B 27/08; F22B 1/1869; F22B 37/003; F22B 1/066; F22B 1/18; F22B 37/06; F22B 37/228; F22B 29/064; F22B 37/102; F22B 1/22; F22B 21/002; F22B 21/28; F22B 29/067; F22B 31/0084; F22B 37/64; F22B 1/021; F22B 1/04; F22B 1/1846; F22B 1/1853; F22B 1/1884; F22B 21/065; F22B 21/22; F22B 35/001; F22B 37/008; F22B 7/12; F22B 9/12; F22B 1/063; F22B 1/265; F22B 1/28; F22B 21/34; F22B 31/08; F22B 37/18; F22B 7/00; F22B 9/04; F22B 1/08; F22B 1/123; F22B 1/16; F22B 1/162; F22B 1/1807; F22B 1/1892; F22B 1/281; F22B 13/026; F22B 17/00; F22B 21/02; F28D 7/024; F28D 7/106; F28D 7/026; F28D 7/12; F28D 9/0018; F28D 9/0025; F28D 5/02; F28D 15/0233; F28D 20/0052; F28D 7/022; F28D 7/08; F28D 7/14; F28D 7/04; F28D 7/0066; F28D 21/0003; F28D 7/10; F28D 1/0477; F28D 7/0033; F28D 2021/0077; F28D 7/082; F28D 7/0016; F28D 7/16; F28D 7/1607; F28D 1/05316; F28D 1/06; F28D 2021/0024; F28D 2021/0068
See application file for complete search history.

(56) References Cited

U.S. PATENT DOCUMENTS

| | | | | |
|---|---|---|---|---|
| 3,247,831 | A * | 4/1966 | Jacobs | C10G 9/20 122/250 R |
| 3,435,627 | A * | 4/1969 | Castillo | F28D 7/022 62/394 |
| 3,643,754 | A * | 2/1972 | Brandin | F25B 41/20 62/394 |
| 3,662,717 | A * | 5/1972 | Ter Haar | C01B 3/363 122/7 R |
| 3,712,371 | A * | 1/1973 | ter Haar | F28D 7/005 165/DIG. 438 |
| 3,788,281 | A * | 1/1974 | Van Lookeren Campagne | F28D 7/0066 165/104.19 |
| 3,875,759 | A * | 4/1975 | Malcosky | F28D 7/022 62/394 |
| 3,976,129 | A * | 8/1976 | Silver | F22B 25/00 165/154 |
| 4,029,054 | A * | 6/1977 | Schuurman | F28F 9/02 165/158 |
| 4,220,200 | A | 9/1980 | Weber | |
| 4,286,653 | A * | 9/1981 | Edwards | F28D 7/14 165/178 |
| 4,462,339 | A | 7/1984 | Jahnke et al. | |
| 5,099,916 | A * | 3/1992 | Vollhardt | C10K 1/04 165/DIG. 414 |
| 5,800,680 | A * | 9/1998 | Guerra | F16J 13/065 201/35 |
| 6,463,757 | B1 * | 10/2002 | Dickson | F25B 43/006 62/509 |
| 7,628,121 | B2 | 12/2009 | Herwig et al. | |
| 2005/0133202 | A1 * | 6/2005 | Jorgensen | F28F 27/02 165/103 |
| 2008/0000261 | A1 * | 1/2008 | Klotten | F25B 40/00 62/503 |
| 2010/0263841 | A1 | 10/2010 | Corry et al. | |
| 2011/0072721 | A1 | 3/2011 | Chen et al. | |
| 2015/0137040 | A1 * | 5/2015 | Pan | C10J 3/86 252/373 |

FOREIGN PATENT DOCUMENTS

| | | | |
|---|---|---|---|
| WO | 9006297 | 6/1990 | |
| WO | 3093205 | 11/2003 | |
| WO | 2007055930 | 5/2007 | |
| WO | WO-2010105266 A2 * | 9/2010 | ............ C10G 45/00 |

OTHER PUBLICATIONS

PCT International Search Report and Written Opinion in International Appln. No. PCT/US2020/016124, dated Jun. 15, 2020, 14 pages.

GCC Exam Report issued in Gulf Cooperation Council Appln. No. GC 2020-39127, dated May 20, 2021, 5 pages.

* cited by examiner

PRODUCING SYNTHETIC GAS

TECHNICAL FIELD

This invention relates to the production of synthetic gas ("syngas"), and more particularly to systems and methods for syngas production that include pressure vessels in which the syngas is cooled.

BACKGROUND

Syngas is a fuel gas mixture consisting primarily of hydrogen, carbon monoxide, and, very often, some carbon dioxide. The name comes from its use as intermediates in creating synthetic natural gas and for producing ammonia or methanol. Syngas is usually a product of gasification and the main application is electricity generation.

An integrated gasification combined cycle is a technology that uses a high-pressure gasifier to turn coal and other carbon-based fuels into syngas. Large cylindrical coolers are used to cool hot syngas and use the sensible heat to generate very high-pressure saturated steam for power generation. The syngas is fed through a combination unit duct into the syngas cooler where the heat in the gas is recovered. The syngas cooler has an evaporator in the lower part of the pressure vessel. The syngas is cooled down by vaporizing of high-pressure boiler water.

SUMMARY

In some aspects, a syngas production system includes a gasification reactor and a syngas pressure vessel downstream of the gasification reactor. The syngas pressure vessel includes: a pressure vessel having a body with a first portion and a second portion; an evaporator disposed in the pressure vessel; a coil disposed in the pressure vessel; and a tongue-and-groove flange assembly that includes: a first flange with a raised ring extending from a face of the first flange, the first flange attached to the first portion of the body; a second flange with a groove defined in a face of the second flange, the second flange attached to the second portion of the body wherein the raised ring extending from the face of the first flange is positioned in the groove defined in the face of the second flange.

Embodiments of these systems can include one or more of the following features.

In some embodiments, the system also includes a fastener attached to the first flange and the second flange. In some cases, the fastener controls a position of the first flange relative to a position of the second flange. In some embodiments, the system also includes a sealing gasket disposed between the groove of the second flange and the raised ring of the first flange.

In some embodiments, the pressure vessel is rated to contain pressures up to 133 Bar.

In some embodiments, the pressure vessel has an inner diameter between 2.5 meters and 3.1 meters. In some cases, the raised ring of the first flange has a diameter between 2.5 meters and 3.1 meters. In some cases, the groove of the second flange has a diameter between 2.5 meters and 3.1 meters.

In some embodiments, the groove of the second flange is sized to receive the raised ring of the first flange.

In some embodiments, the coil is releasably mounted within the pressure vessel.

In some embodiments, the first flange and second flange extend around the coil of the pressure vessel.

In some aspects, a system for cooling a gas includes: a pressure vessel with a diameter between 2.5 meters and 3.1 meters, the pressure vessel having a body with a first portion and a second portion; an evaporator disposed in the pressure vessel; a coil disposed in the pressure vessel; and a tongue-and-groove flange assembly that includes: a first flange with a raised ring extending from a face of the first flange, the first flange attached to the first portion of the body; a second flange with a groove defined in a face of the second flange, the second flange attached to the second portion of the body wherein the raised ring extending from the face of the first flange is positioned in the groove defined in the face of the second flange.

Embodiments of these systems can include one or more of the following features.

In some embodiments, the raised ring of the first flange has a diameter between 2.5 meters and 3.1 meters. In some cases, the groove of the second flange has a diameter between 2.5 meters and 3.1 meters.

In some embodiments, systems also include a sealing gasket disposed in the groove of the second flange. In some cases, the sealing gasket contacts the groove on one end and the raised ring on a second end.

In some embodiments, the system also includes a sealing gasket disposed on the raised ring of the first flange. In some cases, the sealing gasket contacts the groove and the raised ring.

In some embodiments, the system also includes a fastener attached to at least one of the first flange and the second flange.

In some embodiments, the coil is releasably mounted within the pressure vessel.

In some embodiments, the pressure vessel has an operating internal pressure range of 123-130 bar-gauge (barg).

In some embodiments, the pressure vessel is rated to contain pressures up to 133 bar.

In some aspects, methods for maintaining a syngas pressure vessel include: depressurizing a pressure vessel of the syngas pressure vessel; unbolting a first flange attached to a first portion of a body of the pressure vessel from a second flange attached to attached to a second portion of the body of the pressure vessel to release a raised ring extending from a face of the first flange from a groove defined in a face of the second flange; separating the first portion of the body of the pressure vessel from the second portion of the body of the pressure vessel; replacing a first cooling coil in the pressure vessel with a second cooling coil.

Embodiments of these methods can include one or more of the following features.

In some embodiments, depressurizing a pressure vessel includes adjusting an internal pressure of the pressure vessel from a range between 123-130 barg to atmospheric pressure.

In some embodiments, separating the first portion of the body of the pressure vessel from the second portion of the body of the pressure vessel includes moving the first portion along an axis in a first direction.

In some embodiments, the method also includes rebolting the first flange to the second flange to engage the raised ring of the first flange with the groove of the second flange. In some cases, rebolting occurs without requiring torque measurements. In some cases, the method also includes pressurizing the pressure vessel containing the second coil to a range between 64 and 67 barg.

Terms of relative position such "upper", "lower", "right", and "left" are used to indicate the position of components in the figures rather to require specific positions.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
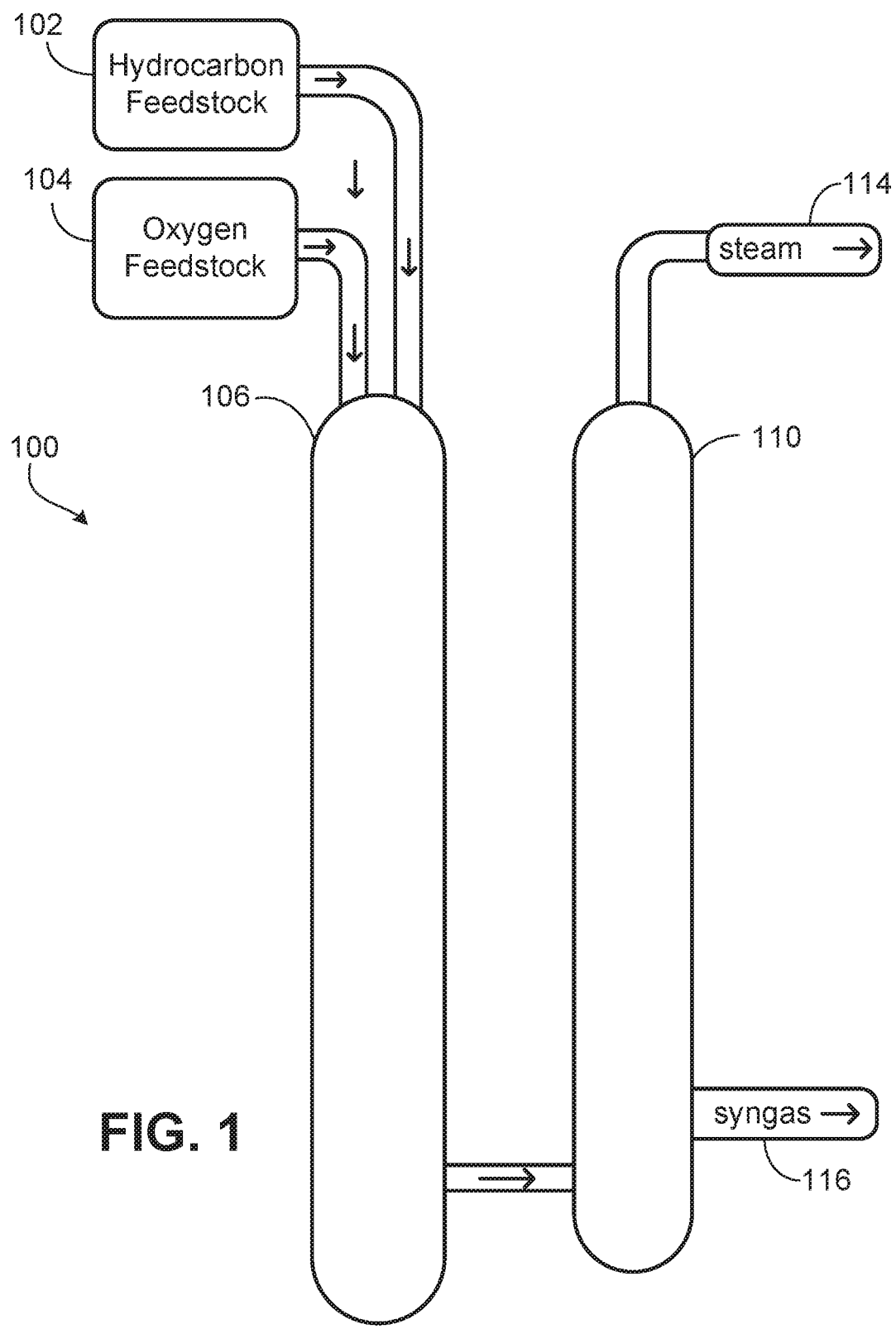
FIG. 1 is a schematic view of a system for generating and cooling syngas with a reactor and a pressure vessel having a tongue-and-groove flange.

Gasification can used to convert solid, liquid or gaseous hydrocarbon feedstock such as coal and heavy oil into syngas through chemical reactions of the feedstock with oxygen-steam mixtures. The hot syngas generated in a gasifier contains contaminants that must be removed before the syngas is used. The gas cleaning processes usually operate at temperatures considerably lower than that of the gasifier. In some systems, a syngas cooler is used to cool the syngas before it enters downstream gas cleaning units and to capture waste heat. Recovery of heat from the high temperature syngas can help achieve high process efficiency.

The internal components of syngas coolers are contained in a large pressure vessel. The pressure vessel must be able to withstand extremely high pressures, temperatures, and volumes. Syngas coolers typically operates with gas inlet (127) temperatures ranging from 1600° C. to 4000° C. and gas-side pressures up to 8 MPa. The internal components are exposed to corrosive raw gas components ($H_2S$, HCl, $H_2$) and are contained in a large pressure vessel. The pressure vessels of syngas coolers can have cylindrical configurations with heights of 30-33 meters and inner diameters of between 2.7 and 3.1 meters, and internal volumes of 170-240 cubic meters.

Main-body flange assemblies that join upper and lower portions of the pressure vessel provide access to the internal components of syngas coolers for periodic maintenance. It has been determined that tongue-and-groove flanges can be used as main body flange assemblies even though standards for tongue-and-groove flanges do not extend to the dimensions and operating parameters required for syngas coolers. This design requires detail finite element analysis to finalize the joint design and evaluate all stresses. Most of design offices do not prefer to perform this type of analysis due to associated costs. In addition, engineers is this field are reluctant to consider systems like this design which have not been previously used for syngas coolers because of the risks associated with the high pressures and volumes of explosive gases associated with syngas coolers.

Such flange assemblies include a main body first flange with a raised ring ("tongue") as a first sealing surface, and a second main body second flange defining a groove as a second sealing surface. Some assemblies include a sealing gasket is inserted between the first sealing surface and the second sealing surface. The first flange, the sealing gasket and the second flange are tightly attached under the action of a fastener.

Adopting this approach for the large, heavy-wall pressure vessels of syngas coolers avoids the need for controlled bolt torque settings, avoids welding crack issues of gasket on welded flange surfaces, and avoids gasket alignment problems during installation and operation. This approach also improves the reliability and availability of plant by providing startup and shut down with fast pressurization and depressurization of heavy wall vessel without impacting equipment integrity. Maintenance on internal components of the syngas cooler can be performed by releasing the tongue-and-groove flange and separating the upper and lower portions of the pressure vessel body from each other. Post-maintenance, the tongue- and groove flange can be used to rejoin the upper and lower portions of the pressure vessel body. This approach enables tightening of bolts at site using bolt tensioners without any issue of cracking the gasket weld and crushing seals and avoids the need for repeated post-weld heat treatment and code recertification/stamp requirement for body flange during replacement of internal components.

FIG. 1 shows a system 100 for producing syngas in an integrated gasification combined cycle. Oxygen feedstock 102 and hydrocarbon feedstock 104 (for example, heavy oil) are preheated before being fed into a reactor 106 where they combine to form syngas and a small amount of unconverted carbon. The reactor 106 discharges the syngas and unconverted carbon to a syngas cooler 110 through, for example, a combination differential unit. The syngas cooler 110 cools the hot gas from the reactor 106 and uses the heat from the gas to generate very high-pressure saturated steam (for example, 340 degrees centigrade (° C.) at 124 bar) for power generation in the combined cycle. The steam exits the syngas cooler 110 through a steam outlet 114. The cooled gas exits the syngas cooler 110 through a gas outlet 116.

Figure 2:
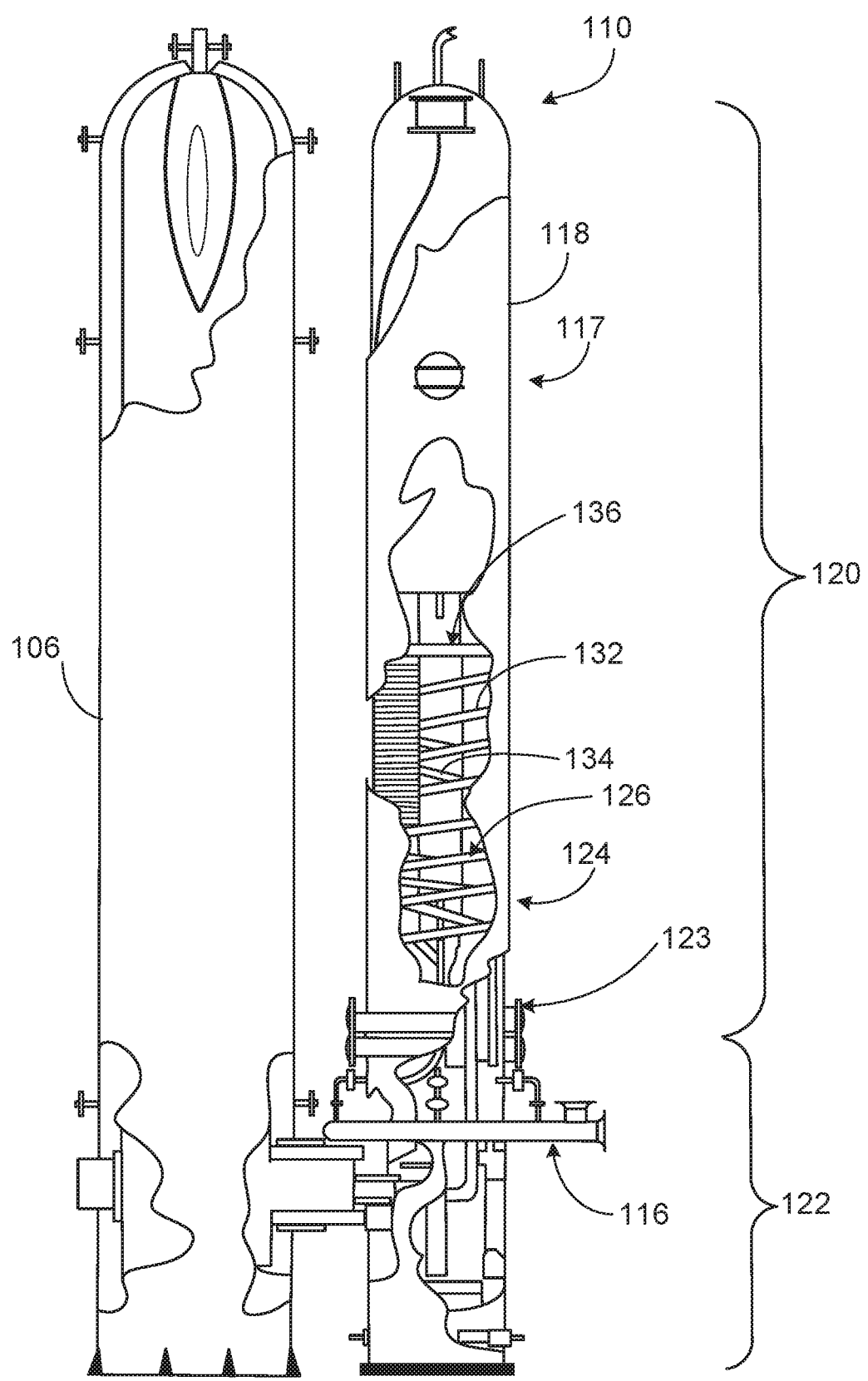
FIG. 2 is a partially cutaway schematic view of the reactor and pressure vessel of the system of FIG. 1.

FIG. 2 shows the reactor 106 and the syngas cooler 110 in more detail. A pressure vessel 117 of the syngas cooler 110 has a body 118 with an upper portion (first portion 120) and a lower portion (second portion 122). A tongue-and-groove flange assembly 123 is used to connect the upper portion 120 and the lower portion 122 of the body 118 of the pressure vessel.

The pressure vessel 117 houses an evaporator 124 with a coil 126. The coil 126 has an inlet in fluid communication and receiving gas from the reactor 106 and an outlet in fluid communication with and discharging cooled gas to the gas outlet 116. As shown in FIG. 2, the coil 126 has a first pathway with a generally helical configuration that extends from the inlet originates at the inlet and extends upwards in the body 118 of the pressure vessel 117. The first pathway ends at a turning point and a second helical pathway extends downwards in the body 118 of the pressure vessel 117. The second pathway ends at the outlet. The second pathway 134 has a diameter smaller than the diameter of the first pathway 132, so that the second pathway 134 is located concentrically within the first pathway 132, but flows gas in an opposite direction.

The syngas cooler 110 cools the gas from the reactor 106 by vaporizing high-pressure water (for example, boiler feed water). The boiler water flows into the syngas cooler 110 with natural circulation enhanced by a downcomer in the center of the evaporator 124. The gas is cooled to approximately 340° C. as it flows through the coil 126. In some pressure vessels, the gas is cooled to a range between 300° C. and 380° C. The heat exchange transforms the boiler water to steam that is superheated, for example, to 340 degrees centigrade ° C. at 124 bar.

The syngas cooler 110 is rated to hold 133 bar. Some pressure vessels are rated between 130 and 135 barg. The life cycle of the syngas cooler 110 is significantly longer than the life cycle of the components such as, for example, the coil 126 within the syngas cooler 110. Replacement of the coil 126 requires separating the upper portion 120 of the body 118 of the pressure vessel 117 from the lower portion 122 of the body 118 of the pressure vessel 117.

Figure 3:
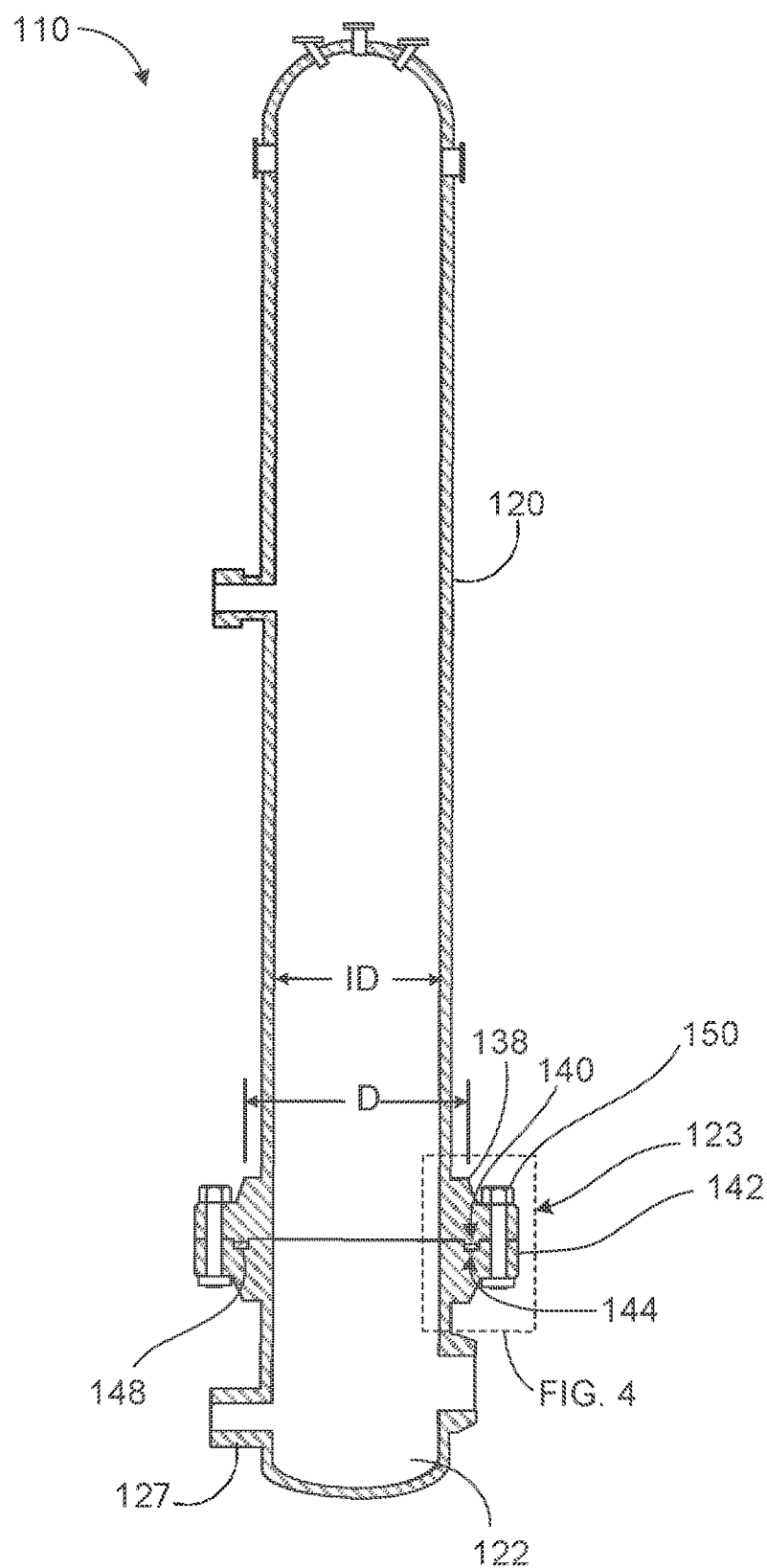
FIG. 3 is a side schematic view of the pressure vessel of the system of FIG. 1 with a tongue-and-groove flange.
Figure 4:
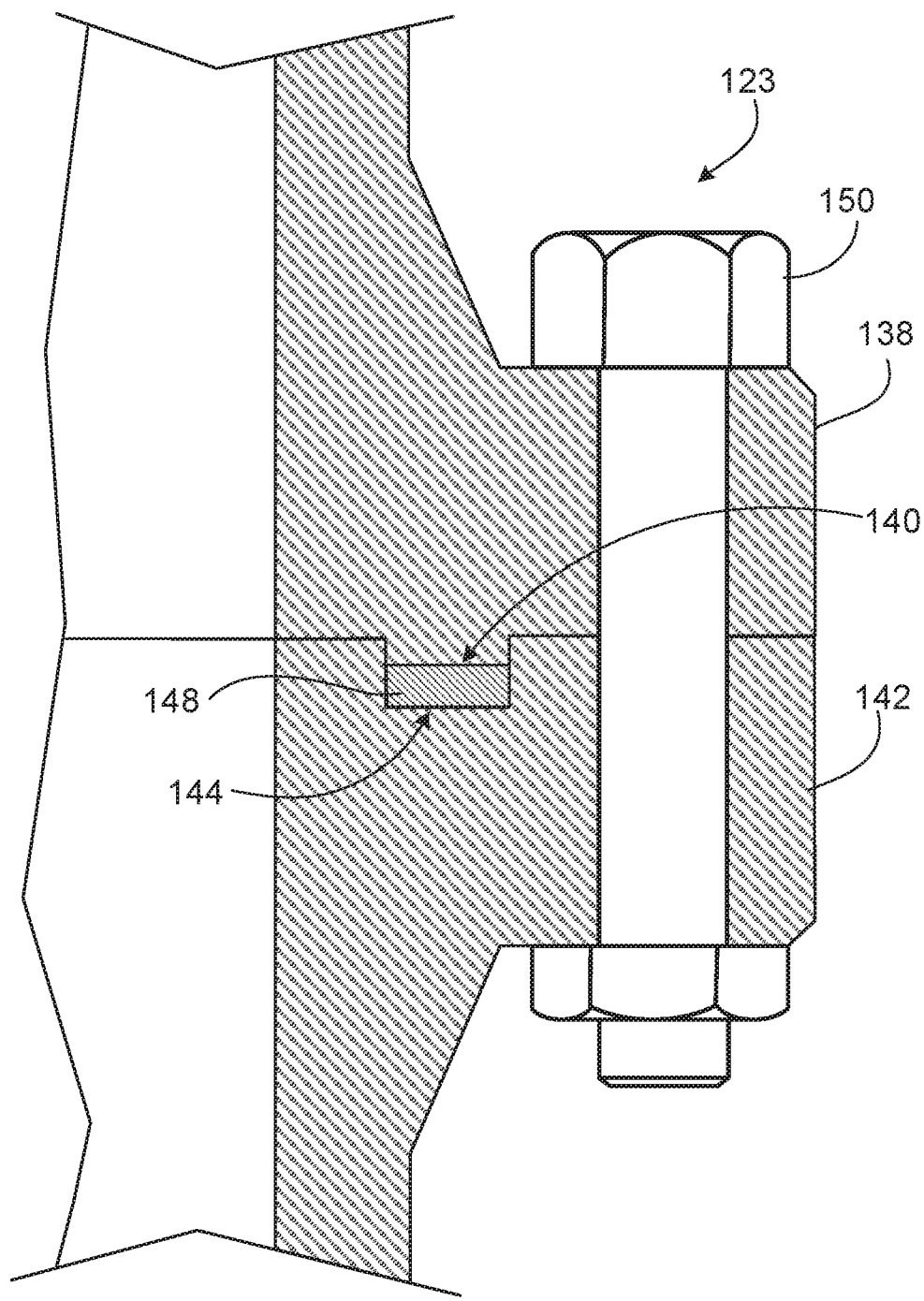
FIG. 4 is an enlarged view of tongue-and-groove flange of the pressure vessel of FIG. 3.

FIGS. 3 and 4 show the tongue-and-groove flange assembly 123 in more detail. As previously discussed, the tongue-and-groove flange assembly 123 connects the upper portion 120 and the lower portion 122 of the body 118 of the pressure vessel 117. The tongue-and-groove flange assembly 123 allows maintenance and replacement of internal components of the syngas cooler 110 without requiring controlled bolt torque settings or welding and avoiding gasket alignment problems. This approach also improves the reliability and availability of plant by providing startup and shut down with fast pressurization and depressurization of heavy wall vessel without impacting equipment integrity. In particular, there is no requirement for tongue and groove torqueing and crushing of gasket will not have any impact on leakage path with this design. In addition, the tongue-and-groove design does not require control of the depressurization rate. In contrast, weld lip syngas cooler designs require control of the depressurizing rate during shutdown to avoid cracking the fillet weld on weld lip gasket will crack due to high thermal stress and hoop stress.

FIG. 3 is a schematic view of the syngas cooler 110 with the tongue-and-groove flange assembly 123 joining the upper portion 120 and the lower portion 122 of the body 118 of the pressure vessel 117. FIG. 4 shows an enlarged view of tongue-and-groove flange assembly 123 of the syngas cooler 110.

The tongue-and-groove flange assembly 123 includes a first flange 138 mounted on the upper portion 120 of the body 118 and a second flange 142 mounted on the lower portion 122 of the body 118. In the tongue-and-groove flange assembly 123, the flanges are separate forged pieces that are welded on upper and lower sections of pressure vessel. The first flange 138 includes a raised ring 140 and the second flange 142 defines a groove 144 sized to receive the raised ring 140 of the first flange 138. Some syngas coolers have the raised ring on the second flange and the groove defined in the first flange.

The body 118 of the pressure vessel 117 has an inner diameter ID of approximately 3 meters. Some syngas coolers have pressure vessels with inner diameters between 2.7 and 3.1 meters. The first flange 138 and the second flange 142 extend around the outside of the body 118 of the pressure vessel 117. The raised ring 140 and the groove 144 of the syngas cooler 110 have a diameter D of approximately 2.75-3.25 m. The tongue (raised ring 140) has a height of 25 millimeters (mm) and a width of 75 mm. Some raised rings 140 have heights of between 20 and 30 mm and widths of between 65 and 85 mm. The groove 144 has a depth of 12 mm. Some grooves have depths between 10 and 14 mm. As the first flange 138 and the second flange 142 extend around the body 118 of the pressure vessel 117, the first flange 138 and the second flange 142 also extend around internal components of the syngas cooler including, for example, the coil 126.

When the body 118 of the pressure vessel 117 is assembled for operation, the raised ring 140 of the first flange 138 is positioned in the groove 144 of the second flange. The syngas cooler 110 also includes a gasket 148 disposed between the raised ring 140 of the first flange 138 and the groove 144 of the second flange. The sealing gasket has a height of 5 mm. Some sealing gaskets have heights between 3 and 7 mm. Bolts 150 installed through the first flange 138 and the second flange 142 are tightened to bring the first flange 138 and the second flange 142 into sealing engagement to contain the high-temperature, high-pressure fluids within the pressure vessel 117.

To perform maintenance on internal components of the syngas cooler 110 (for example, to replace the coil 126), personnel depressurizes the system 100, until the pressure of the syngas cooler 110 is reduced to 123-130 barg. Depressurizing the pressure vessel can include adjusting an internal pressure of the pressure vessel 117 from a range between 123 and 130 barg to an atmospheric pressure. After depressurization, the first flange 138 is unbolted from the second flange 142 to release the raised ring 140 from the groove 144 defined in the second flange. The first portion 120 of the body 118 of the pressure vessel 117 is separated from the second portion 122 of the body 118 of the pressure vessel 117. Separating the first portion 120 of the body 118 of the pressure vessel 117 from the second portion 122 of the body 118 of the pressure vessel 117 can include moving the first portion 120 along an axis of the syngas cooler 110 in a first direction. For example, the first portion 120 of the body 118 of the pressure vessel 117 can be lifted off the second portion 122 of the body 118 of the pressure vessel 117 using a crane.

After maintenance, the first portion 120 of the body 118 of the pressure vessel 117 can be reassembled with the second portion 122 of the body 118 of the pressure vessel 117. The first portion 120 of the body 118 of the pressure vessel 117 can be placed on the second portion 122 of the body 118 of the pressure vessel 117. Engagement of the raised ring 140 of the first flange 138 with the groove 144 of the second flange 142 can help align the first portion 120 of the body 118 of the pressure vessel 117 with the second portion 122 of the body 118. After alignment, the bolts 150 are reinstalled and tightened to bring the first flange 138 and the second flange 142 into sealing engagement. The rebolting does not require torque measurements because, in contrast to weld lip designs there is not a concerns regarding cracking the welds. After reassembling is complete, the pressure vessel 117 (now containing the new coil) is pressurized to a range between 60 and 84 barg.

A number of systems and methods have been described. Nevertheless, it will be understood that various modifications may be made without departing from the spirit and scope of this disclosure. Accordingly, other embodiments are within the scope of the following claims.

What is claimed is:

1. A apparatus for cooling a gas, the system comprising:
a pressure vessel with a diameter between 2.5 meters and 3.1 meters, the pressure vessel having a body with a first portion and a second portion, wherein the pressure vessel is rated to contain pressures up to at least 133 bar, the pressure vessel comprising:
a gas inlet arranged in the second portion of the pressure vessel, and
a gas outlet arranged in the second portion of the pressure vessel, wherein the gas outlet is fluidly connected to the gas inlet;
an evaporator disposed in the pressure vessel;
a coil disposed in the pressure vessel and releasably engaged with the pressure vessel; and a tongue-and-groove flange assembly comprising:
  a first flange with a raised ring extending from a face of the first flange, the first flange attached to the first portion of the body;
  a second flange with a groove defined in a face of the second flange, the second flange attached to the second portion of the body wherein the raised ring extending from the face of the first flange is positioned in the groove defined in the face of the second flange.

2. The apparatus according to claim 1, wherein the raised ring of the first flange has a diameter between 2.5 meters and 3.1 meters.

3. The apparatus according to claim 1, wherein the groove of the second flange has a diameter between 2.5 meters and 3.1 meters.

4. The apparatus according to claim 1, further comprising a sealing gasket disposed in the groove of the second flange.

5. The apparatus according to claim 4 wherein the sealing gasket contacts the groove of the second flange and the raised ring of the first flange.

6. The apparatus according to claim 1 further comprising a sealing gasket disposed on the raised ring of the first flange.

7. The apparatus according to claim 1, further comprising a fastener attached to at least one of the first flange and the second flange.

8. The apparatus according to claim 1, wherein the pressure vessel has an internal pressure range of operating internal pressure range of 123-130 bar-gauge (barg).

9. The apparatus according to claim 1, wherein the pressure vessel is rated to contain pressures up to at least 133 bar.

10. The apparatus according to claim 1, further comprising a helical coil configured to fluidly connect the fluid inlet and the fluid outlet.

11. The apparatus according to claim 10, wherein the coil comprises a first helical path configured to flow a fluid in a first direction and a second helical path configured to flow the fluid in a second direction.

12. The apparatus according to claim 11, wherein the coil further comprises a turning point, wherein the turning point connects the first helical path and the second helical path.

13. The apparatus according to claim 11, wherein the first helical path connects to the gas inlet and the second helical path connects to the gas outlet.

14. The apparatus according to claim 11, wherein the first helical path has a diameter and the second helical path has a diameter, wherein the diameter of the first helical path is greater than the diameter of the second helical path.

* * * * *